M. FRIED.
TOOL HOLDER.
APPLICATION FILED JAN. 24, 1912.
1,049,694.
Patented Jan. 7, 1913.
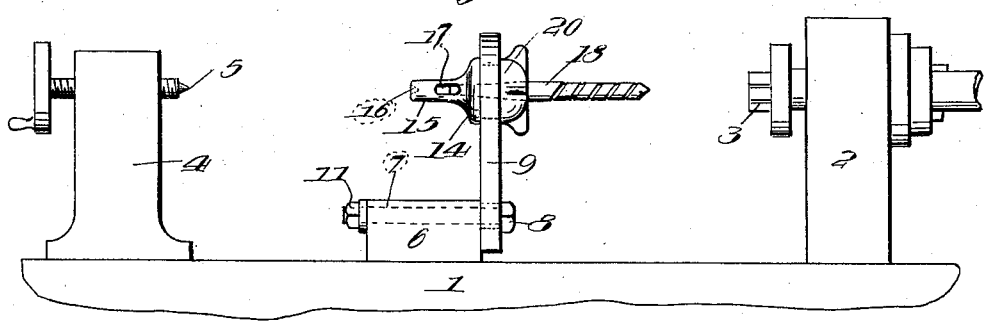
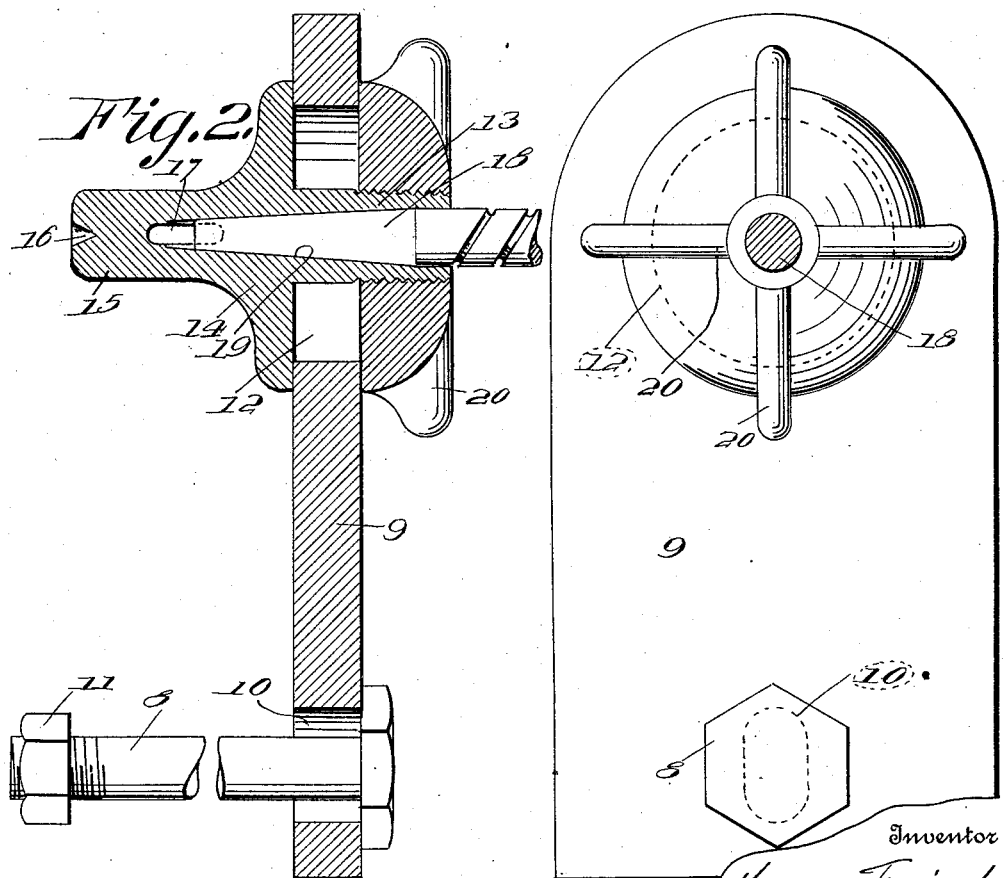

UNITED STATES PATENT OFFICE.

MARCUS FRIED, OF PROVIDENCE, RHODE ISLAND.

TOOL-HOLDER.

1,049,694.  Specification of Letters Patent.  Patented Jan. 7, 1913.

Application filed January 24, 1912. Serial No. 673,078.

*To all whom it may concern:*

Be it known that I, MARCUS FRIED, a citizen of the United States, residing at Providence, in the county of Providence and State of Rhode Island, have invented a new and useful Improvement in Tool-Holders, of which the following is a specification.

This invention pertains to certain new and useful improvements in tool holders, and relates more particularly to devices of this character that are used for boring and drilling in connection with an engine or speed lathe.

The objects of the invention are to provide an improved and simplified device of this type which can be easily and quickly adjusted to properly center the drill, or other tool with relation to the chuck that carries the work.

In the drawings, Figure 1 is a side elevation of an engine lathe equipped with the present invention. Fig. 2 is a vertical sectional view of the invention detached from the lathe, and Fig. 3 is a fragmentary front elevation.

The bed of the engine lathe is designated 1 and has the usual head stock 2 carrying the chuck or work holder 3, and the tail stock 4 provided with the usual center point 5. The table 6 of the slide rest is provided with a horizontal slot 7 through which a bolt 8 passes, the head of the bolt being engaged with the front face of a vertical arm 9 that has an elongated slot 10 through which the bolt 8 passes, the slot permitting vertical adjustment of the arm in an obvious manner. The nut 11 of the bolt 8 binds against the rear end of the table 6 and serves to hold the parts in rigid position, after proper adjustment thereof. The upper or top end of the arm 9 is formed with a large opening 12 through which the threaded shank 13 of the tool holder passes. The shank 13 is formed integral with a head 14 that abuts the rear face of the arm 9, the head 14 having a rearwardly extending stud 15 the outer end of which is formed with a conical socket 16 for the purpose of receiving the center point 5 of the tail stock 4. A slot 17 extends through the stud 15 and is for the purpose of admitting a wedge that is brought to engage with the rear end of the drill 18 to cause the latter to be moved out of the tapering socket 19 formed in the tool holder for the reception of the drill. A winged nut 20 engages over the threaded shank 13 and has its rear face impinging against the front face of the arm 9, whereby the tool holder is rigidly held in any position to which it may be adjusted.

In operation, the arm 9 is secured in position on the table 6, and the table 6 is then moved to cause the arm to aline with the center point 5 whereupon the bolt 11 is tightened to hold the arm in rigid position, after which the nut 20 is loosened and the tool holder adjusted to cause the center point 5 to enter the socket 16 and bring the flat finished surface of the head 14 into contact with the flat finished surface of the arm 9, thus properly alining the tool holder after which the nut 20 is tightened to hold the parts in rigid position.

Having thus described my invention, I claim as new and desire to secure by Letters Patent;—

1. In a tool holder, a vertical arm having a slot at its lower end for the reception of a bolt to secure said arm to the front face of the lathe slide rest, the upper end of said arm being formed with a large opening, a tool holder proper consisting of a head formed with a threaded shank that extends through said large opening of the arm, said head being for abutting engagement with the rear face of said arm and having a rearwardly projecting stud the rear end of which is formed with a conical socket to receive the center point of the tail stock, said shank being formed with a conical socket for receiving a drill or other tool, and a winged nut on said threaded shank for abutting engagement with the front face of the arm to hold the head stationary.

2. In a tool holder, in combination with an arm for securement to the carriage of the lathe, which arm is formed with an opening at its top end, a tool holder proper having a head on one end which abuts the rear face of the arm and having a threaded shank which extends through said opening and is formed with a tapering socket to receive the tool, the rear end of said head having a socket to receive the center point of the tail stock and a nut on said threaded shank engaging the front face of said arm.

3. In a tool holder, a vertical arm having a transverse enlarged opening in its upper end, a tool holder proper having an enlarged portion abutting the rear face of said arm and having a threaded part which is longitudinally socketed to receive the tool, said threaded part of the tool holder proper being received in said enlarged opening of the arm and being adjustable radially of said enlarged opening, and means on said threaded part to abut the front face of said arm to draw said enlarged portion of the tool holder proper in binding relation to said arm.

4. In a tool holder in combination with a vertical arm having an enlarged opening in its upper end and a slot in its lower end, means extending through the slot to adjustably secure the arm to the slide rest of a lathe, a tool holder proper having an enlarged part that abuts the rear face of the arm and a threaded shank that is received in said arm opening and is radially adjustable in the latter and is longitudinally socketed to receive the tool, and a nut on said shank to engage the front face of the arm to bind the enlarged part of the tool holder against the rear face of the arm.

5. In a tool holder, a vertical arm having an opening in its upper end, a tool holder proper having a central enlarged portion the front face of which abuts the rear face of said arm, said holder proper having its rear end projecting on the rear side of said arm and formed with a socket to receive the center point of the tail stock and having its front end threaded and extending through said arm opening and disposed on the front side of the arm and formed with a socket to receive the tool, and a nut on said threaded end of the holder proper to abut the front face of the arm.

In testimony whereof I have signed my name to this specification in the presence of two subscribing witnesses.

MARCUS FRIED.

Witnesses:
ADA E. HAGERTY,
J. A. MILLER.

---

Copies of this patent may be obtained for five cents each, by addressing the "Commissioner of Patents, Washington, D. C."